(12) United States Patent
Yamaguchi et al.

(10) Patent No.: US 12,219,288 B2
(45) Date of Patent: Feb. 4, 2025

(54) REFLECTIVE SCREEN, REFLECTIVE SCREEN UNIT, AND VIDEO DISPLAY DEVICE

(71) Applicant: Dai Nippon Printing Co., Ltd., Tokyo (JP)

(72) Inventors: Sunao Yamaguchi, Tokyo (JP); Masashi Hiromitsu, Tokyo (JP)

(*) Notice: Subject to any disclaimer, the term of this patent is extended or adjusted under 35 U.S.C. 154(b) by 221 days.

(21) Appl. No.: 17/906,266

(22) PCT Filed: Mar. 18, 2021

(86) PCT No.: PCT/JP2021/011136
§ 371 (c)(1),
(2) Date: Dec. 14, 2022

(87) PCT Pub. No.: WO2021/187570
PCT Pub. Date: Sep. 23, 2021

(65) Prior Publication Data
US 2023/0130094 A1 Apr. 27, 2023

(30) Foreign Application Priority Data
Mar. 18, 2020 (JP) .................................. 2020-047506

(51) Int. Cl.
G03B 21/602 (2014.01)
G02B 3/08 (2006.01)
H04N 5/74 (2006.01)

(52) U.S. Cl.
CPC ............. *H04N 5/7408* (2013.01); *G02B 3/08* (2013.01); *G03B 21/602* (2013.01)

(58) Field of Classification Search
CPC .................... G03B 21/56–608; G02B 3/08
See application file for complete search history.

(56) References Cited

U.S. PATENT DOCUMENTS

| 7,245,427 B2 * | 7/2007 | Sekiguchi ............ G03B 21/625 359/457 |
| 7,259,912 B2 * | 8/2007 | Gohman ................. G03B 21/10 353/77 |
| 2005/0041286 A1 | 2/2005 | White |

FOREIGN PATENT DOCUMENTS

| JP | H06-038151 A | | 2/1994 |
| JP | 11133509 A | * | 5/1999 |

(Continued)

OTHER PUBLICATIONS

International Search Report and Written Opinion (Application No. PCT/JP2021/011136) dated Jun. 8, 2021 (with English translation).

*Primary Examiner* — Leon W Rhodes, Jr.
(74) *Attorney, Agent, or Firm* — BURR PATENT LAW, PLLC

(57) ABSTRACT

A reflective screen including a Fresnel lens-shaped lens layer having unit lenses and a reflective layer formed on the unit lenses for reflecting light. The unit lens protrudes from a video source side to a back surface side in the thickness direction of the lens layer. In the lens layer, a flat part having a flat surface f on the back surface side is formed at at least one end edge. In the thickness direction of the lens layer, a maximum lens height h1max of a lens height h1 that is the distance from a position closest to the video source side to a position closest to the back surface side, and a flat surface height h2 that is the distance from the position closest to the video source side of the unit lens to the flat surface f of the flat part 114 satisfy h2≥h1max.

6 Claims, 5 Drawing Sheets

(56) References Cited

FOREIGN PATENT DOCUMENTS

| | | | | |
|---|---|---|---|---|
| JP | 2009-210854 A | 9/2009 | | |
| JP | 2012-226047 A | 11/2012 | | |
| JP | 2013-171114 A | 9/2013 | | |
| JP | 2015-014765 A | 1/2015 | | |
| JP | 2016-200684 A | 12/2016 | | |
| KR | 20170120459 A | * 10/2017 | ............. | G02B 27/01 |

* cited by examiner

REFLECTIVE SCREEN, REFLECTIVE SCREEN UNIT, AND VIDEO DISPLAY DEVICE

TECHNICAL FIELD

The present invention relates to a reflective screen which displays by reflecting projected video light, a reflective screen unit including this reflective screen, and a video display device including this reflective screen unit.

BACKGROUND ART

Conventionally, a reflective screen has been disclosed which forms a reflective layer on a lens layer having a Fresnel lens shape in which a plurality of unit lenses are arranged in order to favorably display video light projected from a short-focus type video source (for example, refer to Patent Document 1).

Patent Document 1: Japanese Unexamined Patent Application, Publication No. 2013-171114

DISCLOSURE OF THE INVENTION

Problems to be Solved by the Invention

In the aforementioned reflective screen, a bezel is joined to the video source side, and a support plate is joined to the back surface side. The reflective screen is joined with the bezel and support plate by a junction layer (adhesive, glue, etc.). However, since the lens layer having a substantially triangular cross-sectional shape is presented at the back surface side of the reflective screen, unevenness is formed at the surface of the junction layer laminated on the back surface side of the reflective screen. For this reason, it is not possible to sufficiently adhere the reflective screen and support plate due to the unevenness of the surface of the junction layer, and there have been cases where both peel apart. An object of the present invention is to provide a reflective screen which improves adhesion with a support plate, and a reflective screen unit and video display device including this.

Means for Solving the Problems

The present invention solves the problem with the following such solution. It should be noted that, for facilitating understanding, the reference numbers corresponding to the embodiment of the present invention will be attached and explained; however, it is not to be limited thereto. In addition, the configurations explained by attaching reference numbers may be improved as appropriate, and at least part may be substituted with other components.

A first aspect of the present invention relates to a reflective screen (10) which observably displays by reflecting video light projected from a video source (2), the reflective screen including: a lens layer (11) of Fresnel lens shape in which a plurality of unit lenses (111) are arranged; and a reflective layer (12) which is formed on the unit lens of the lens layer, and reflects light, in which the unit lens is convex towards a back surface side from a video source side in a thickness direction of the lens layer, a flat part (114) at which a back surface side becomes a flat surface (f) is formed in at least an edge of the lens layer, and in a thickness direction of the lens layer, a largest lens height h1max of a lens height h1, which is a distance from a position (v) that is a most video source side until a position (t) that a most back surface side of the unit lens, and a flat surface height h2 which is a distance from a position (v) which is a most video source side of the unit lens until the flat surface of the flat part satisfy a relationship h2≥h1max.

A second aspect of the present invention relates to the reflective screen (10) as described in the first aspect, in which the flat surface height h2 differs according to position of the flat part (114), and a smallest flat surface height h2 min of the flat surface height h2 satisfies a relationship h2 min≥h1max.

A third aspect of the present invention relates to the reflective screen as described in the first or second aspect, in which the lens layer is an oblong rectangular shape viewed from a video source side, and the flat part is formed in at least one edge on a long side of the lens layer.

A fourth aspect of the present invention relates to the reflective screen as described in the first or second aspect, in which the lens layer is an oblong rectangular shape viewed from a video source side, and the flat part is formed in at least one edge on a long side of the lens layer and at least one edge of a short side of the lens layer.

A fifth aspect of the present invention relates to the reflective screen (10) as described in any one of the first to fourth aspects, in which the unit lens (111) includes a lens surface (112) to which video light is incident, and a non-lens surface (113) adjacent to the lens surface in an arrangement direction of the unit lens, and the flat part (114) is at least provided to an edge more to a side of the lens surface than the non-lens surface, in the arrangement direction of the unit lens, among edges of the lens layer (11).

A sixth aspect of the present invention relates a reflective screen unit (1) including: the reflective screen as described in any one of the first to fifth aspects; a bezel (20) of window frame shape provided to a video source side of the reflective screen, and covering the flat part; a support plate (30) provided to a back surface side of the reflective screen, and maintaining flatness of a screen of the reflective screen; and a junction layer (40) provided between the reflective screen and the support plate, and joining the reflective screen and the support plate.

A seventh aspect of the present invention relates to a video display device (100) including: the video screen unit as described in the sixth aspect; and a video source (2) which projects video light towards the reflective screen.

Effects of the Invention

According to the present invention, since it is possible to improve the adhesion between the support plate and reflective screen, it is possible to suppress peeling apart of both.

PREFERRED MODE FOR CARRYING OUT THE INVENTION

Figure 1A:
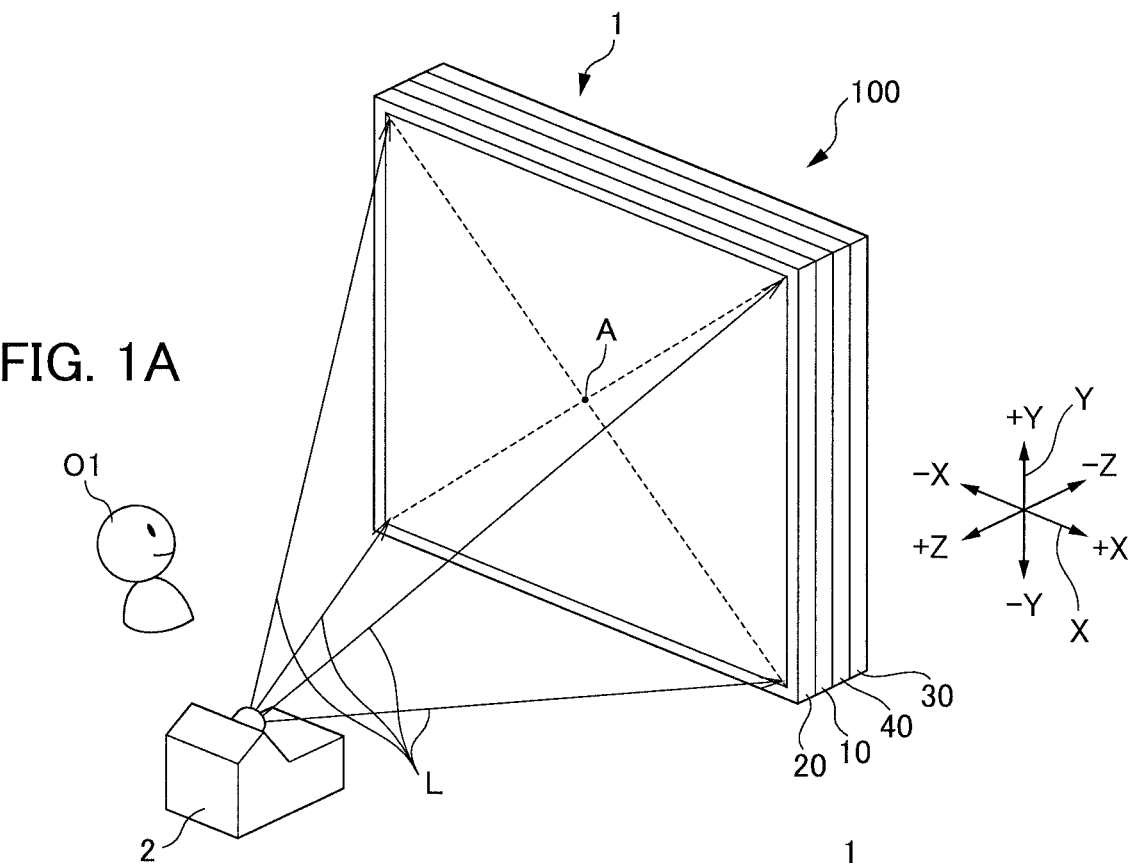
FIGS. 1A and 1B are views showing a video display device 100 of an embodiment.
Figure 1B:
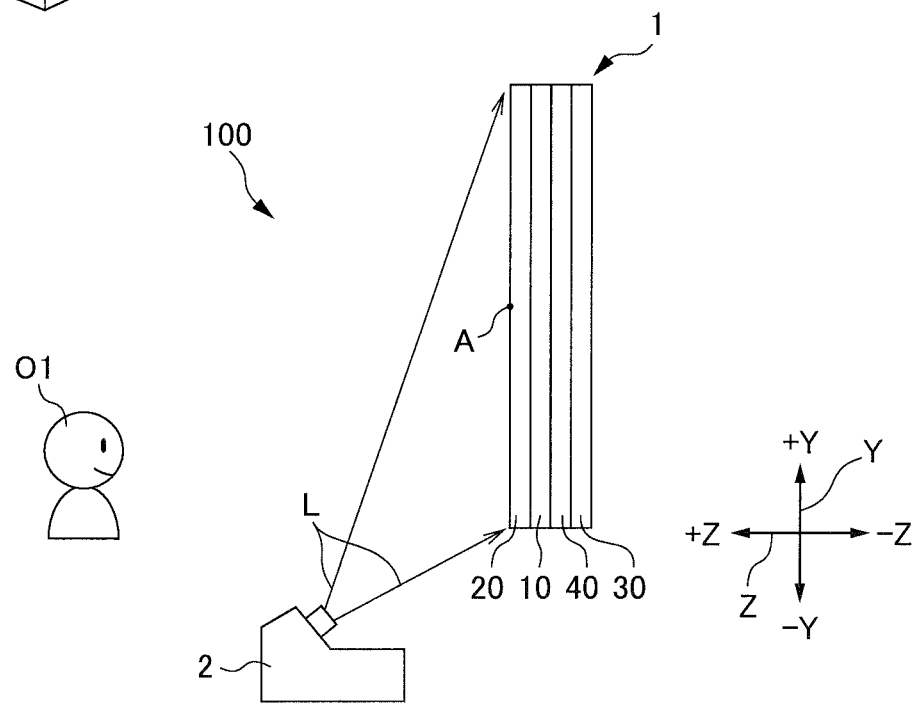

Hereinafter, an embodiment of the present invention will be explained by referencing the drawings, etc. It should be noted that each diagram shown below including FIGS. 1A and 1B are schematically shown views, and the size and shape of each part are exaggerated as appropriate in order to facilitate understanding. In the present disclosure, the terminology specifying the shape and geometrical conditions, for example, the terminology of parallel, orthogonal, etc., in addition to when having a strict meaning, also include states having an extent of error exerting the same optical function and can be regarding as parallel or orthogonal.

In the present disclosure, the numerical value such as of the dimensions of each member described, material names, etc. are examples as an embodiment, are not to be limited thereto, and may be selected and employed as appropriate. In the present disclosure, screen surface indicates a surface which becomes a planar direction of the screen when viewing the screen as a whole, and is parallel to the screen (display surface) of the screen.

FIGS. 1A and 1B are views showing a video display device 100 of the present embodiment. FIG. 1A is a perspective view of the video display device 100. FIG. 1B is a diagram viewing the video display device 100 from a lateral face. As shown in FIGS. 1A and 1B, the video display device 100 includes a reflective screen unit 1, a video source 2, etc. The reflective screen unit 1 includes a reflective screen 10 (described later), etc., and displays video on the screen (display surface) of a video source side by reflecting video light L projected from the video source 2. Details of the reflective screen unit 1 will be described later.

Each diagram shown below including FIGS. 1A and 1B show an XYZ orthogonal coordinate system as appropriate. In this coordinate system, the screen left/right direction (horizontal direction) of the reflective screen unit 1 (reflective screen 10) is defined as the X direction, the screen up/down direction (vertical direction) is defined as the Y direction, and the thickness direction of the reflective screen unit 1 is defined as the Z direction. The screen of the reflective screen unit 1 is parallel to the XY plane, and the thickness direction (Z direction) of the reflective screen unit 1 is orthogonal to the screen of the reflective screen unit 1.

In addition, viewing from an observer O1 positioned in the front direction on a video source side of the reflective screen unit 1, a direction facing the right side in the screen left/right direction is defined as the +X direction, and a direction facing the left side is defined as the −X direction. A direction facing upwards in the screen up/down direction is defined as the +Y direction, and a direction facing downwards is defined as the −Y direction. A direction facing the video source side from the back surface side (rear side) in the thickness direction is defined as the +Z direction, and a direction facing the back surface side from the video source side is defined as the −Z direction. Furthermore, in the following explanation, the screen up/down direction, screen left/right direction and thickness direction, unless otherwise specified, correspond to the screen up/down direction (vertical direction), screen left/right direction (horizontal direction), and thickness direction (depth direction) in the usage state of the reflective screen unit 1. These respective directions are respectively parallel to the Y direction, X direction and Z direction. It should be noted that "~direction" may also be called "~side" in the present disclosure.

The video source 2 is a video projection device (projector) which projects video light L onto the reflective screen unit 1. The video source 2 of the present embodiment is a short-focus type projector. When viewing the screen (display region) of the reflective screen unit 1 from a front direction (normal vector direction) of the video source side (+Z side) in the usage state of the video display device 100, the video source 2 is the center in the screen left/right direction of the reflective screen unit 1, and is installed more to a downward side in the vertical direction (−Y side) than the screen of the reflective screen unit 1.

The video source 2, in the depth direction (Z direction), can project the video light L obliquely, from a position at which the distance from the surface on the video source side (+Z side) of the reflective screen unit 1 is drastically closer compared to a conventional general-purpose projector. Therefore, compared to the conventional general-purpose projector, the video source 2 has a short projection distance to the reflective screen unit 1, the incident angle of the projected video light incident on the reflective screen unit 1 is large, and the amount of change of the incident angle (amount of change from the minimum value to maximum value) is also large.

The reflective screen unit 1 displays video by reflecting the video light L projected by the video source 2 towards the observer O1 side positioned on the video source side (+Z side). The screen (display region) of the reflective screen unit 1 is a rectangular shape in which the long side direction viewing from the observer O1 side of the video source side (+Z side) is the screen left/right direction (X direction) in the usage state. In other words, the screen of the reflective screen unit 1 (reflective screen 10) of the present embodiment is an oblong rectangular shape viewed from the video source side.

Figure 2:
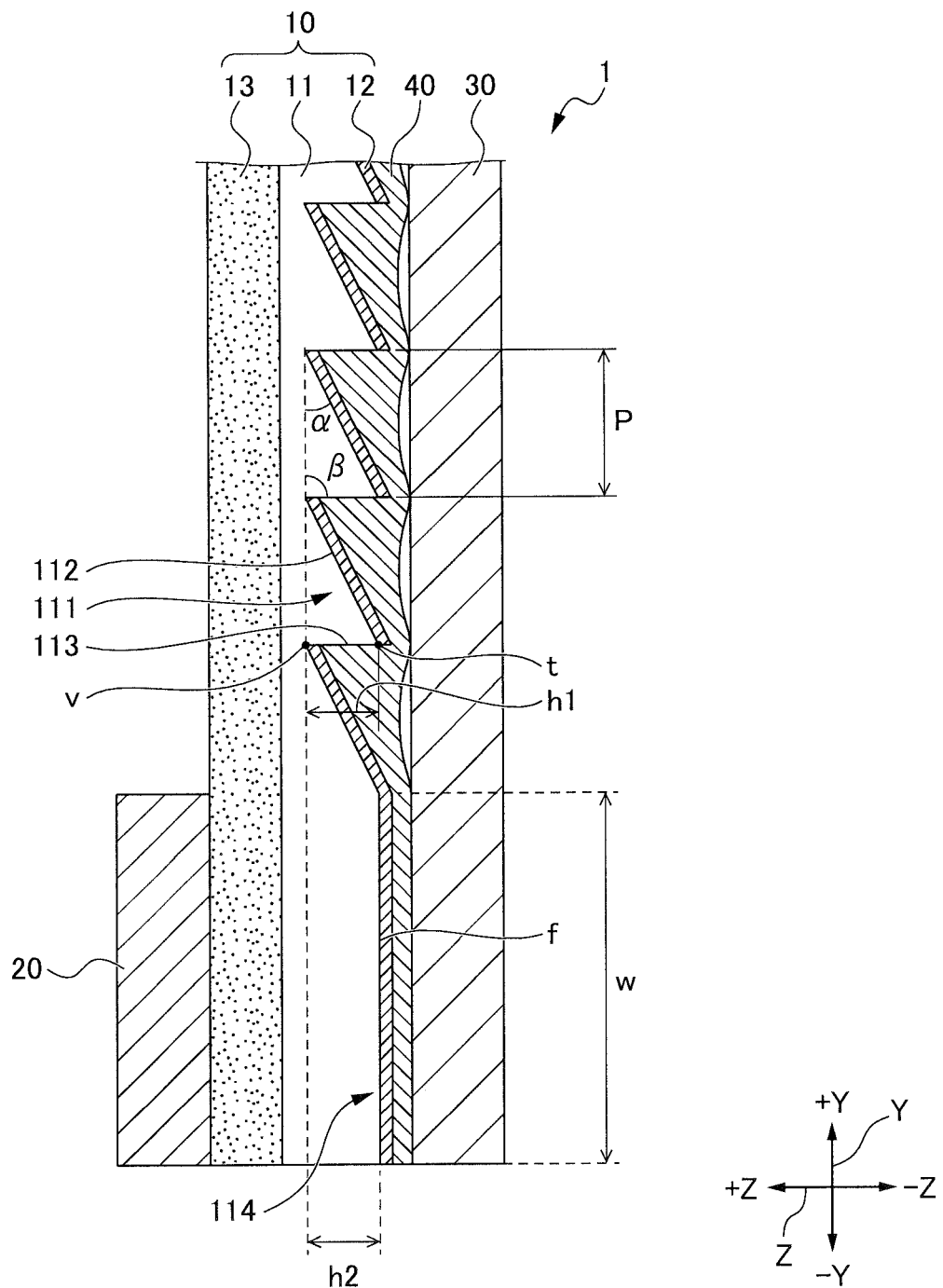
FIG. 2 is a view for explaining a layer configuration of a reflective screen unit 1 and reflective screen 10 of an embodiment.
Figure 3:
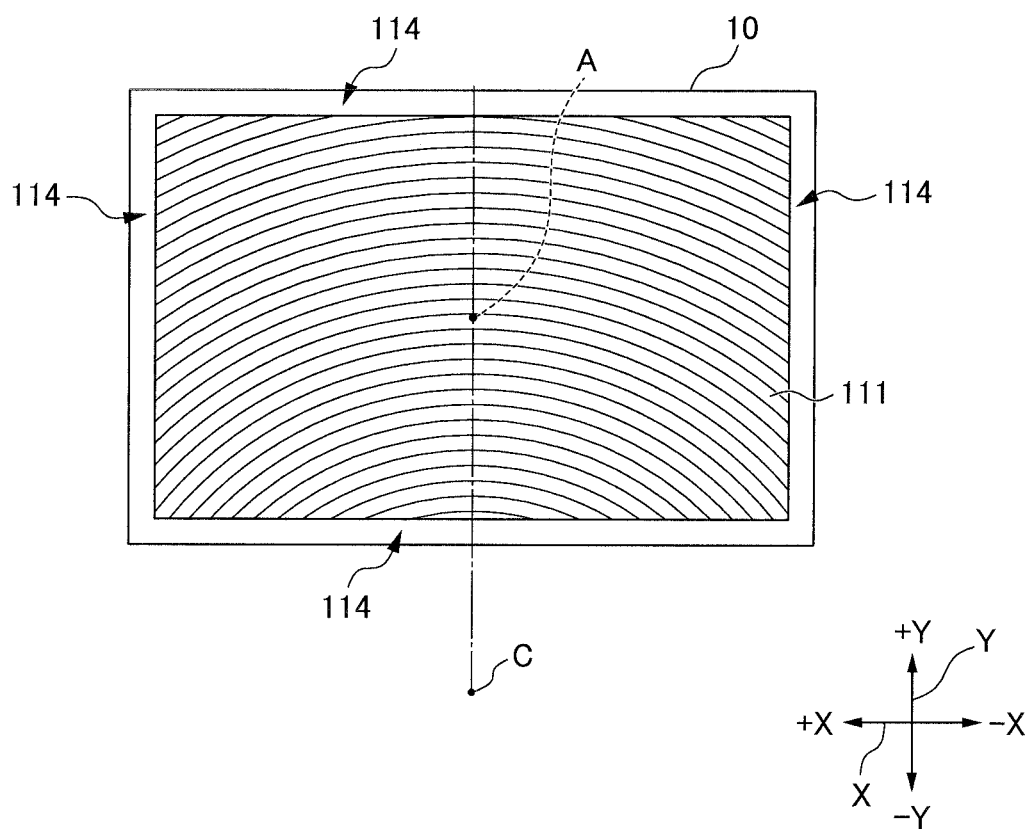
FIG. 3 is a diagram viewing the reflective screen 10 from a back surface side (−Z side)
Figure 4:
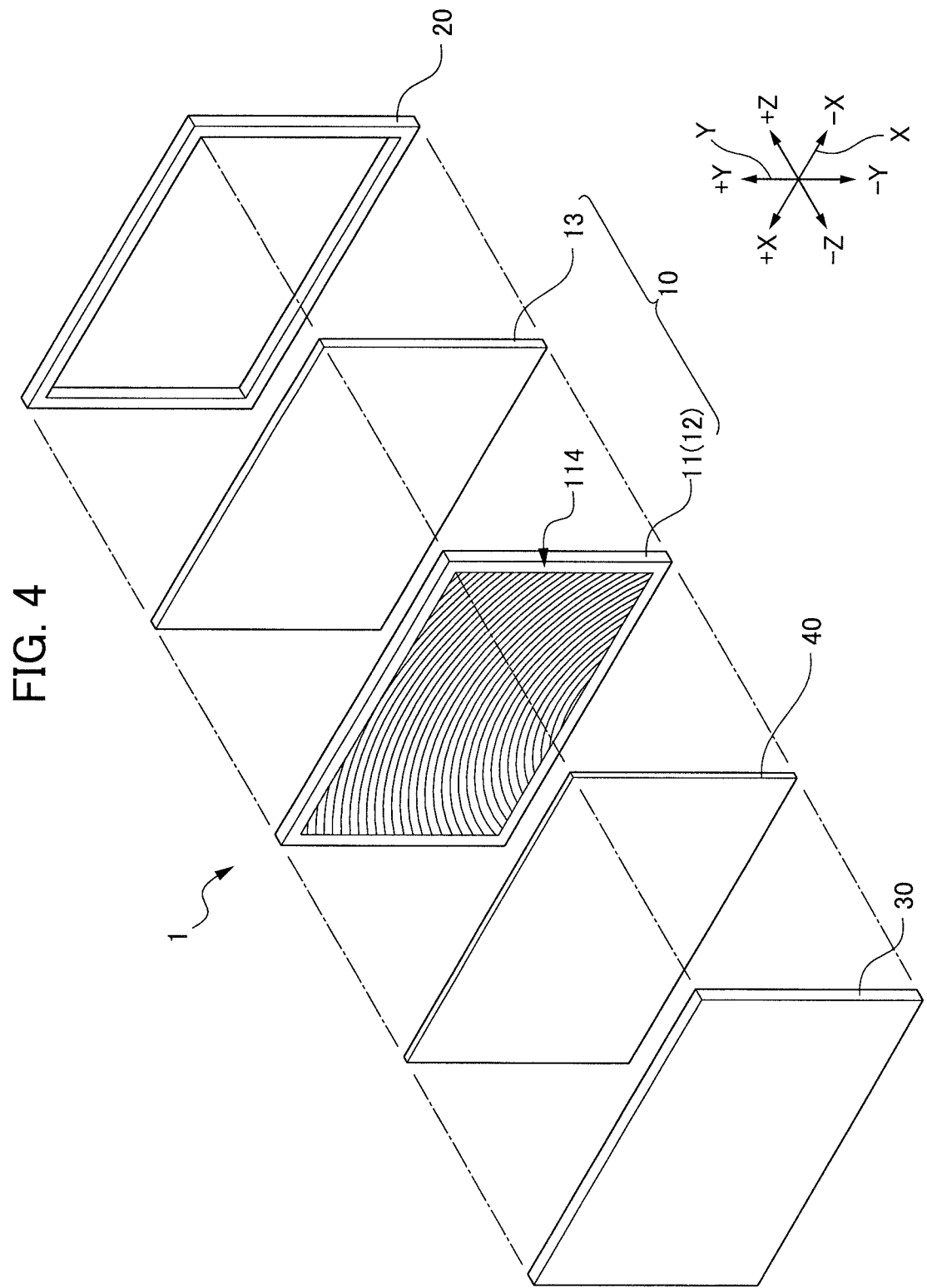
FIG. 4 is an exploded perspective view of the reflective screen unit 1.

FIG. 2 is a view for explaining a layer configuration of the reflective screen unit 1 and reflective screen 10 of the present embodiment. FIG. 2 shows enlarged a part of the cross-section (Y-Z plane) parallel to the thickness direction (Z direction), which is parallel to the arrangement direction of the unit lens 111 (described later), passing through the geometrical center A of the reflective screen 10, which is a region on the lower side (−Y side) of the reflective screen unit 1. FIG. 3 is a diagram viewing the reflective screen 10 from a back surface side (−Z side). It should be noted that, in FIG. 3, illustration of a reflective layer 12 provided at the back surface side of the lens layer 11 is omitted. FIG. 4 is an exploded perspective view of the reflective screen unit 1. In FIG. 4, the appearance, shape, etc. of each part are simplified.

As shown in FIG. 2 and FIG. 4, the reflective screen unit 1 includes, in order from the video source side (+Z side), a bezel 20, the reflective screen 10, a junction layer 40 and a support plate 30.

<Reflective Screen 10>

The reflective screen 10 is a sheet member (laminate body) which observably displays by reflecting the video light projected from the video source 2. The reflective screen 10 of the present embodiment includes a lens layer 11, reflective layer 12 and light diffusion layer 13. It should be noted that the reflective screen 10 is sufficient so long as including at least the lens layer 11 and reflective layer 12.

<Lens Layer 11>

The lens layer 11 is a sheet material having optical transparency formed on the back surface side (−Z side) of the light diffusion layer 13. The lens layer 11, as shown in FIG. 3, has a circular Fresnel lens shape in which a plurality of unit lenses 111 are arranged concentrically around a point C. In the circular Fresnel lens shape, the point C serving as the optical center (Fresnel center) is outside the region of the screen (display region) of the reflective screen 10, and positioned at the lower side (−Y side) of the reflective screen 10. In the present embodiment, the optical center C is provided on a parallel line (dashed line in FIG. 3) to the screen up/down direction (Y direction) passing through the geometrical center A of the reflective screen 10, as shown in FIG. 3, and the circular Fresnel lens shape is formed with axial symmetry relative to this line (dashed line in FIG. 3).

As shown in FIG. 2, the unit lens 111 has a shape that is substantially triangular in a cross section parallel to the arrangement direction of the unit lenses 111, which is parallel to the thickness direction (Z direction) which is orthogonal to the screen surface. The unit lens 111 is formed so as to be convex towards the back surface side (−Z side) from the video source side (+Z side). The unit lens 111 includes the lens surface 112, and a non-lens surface 113 which is opposite (adjacent) the lens surface 112 in the arrangement direction of the unit lenses 111. In the usage state of the reflective screen unit 1, the lens surface 112 of the unit lens 111 is positioned more to the upper side (+Y side) in a vertical direction than the non-lens surface 113 to interpose the apex t. The apex t indicates a position which becomes the most back surface side (−Z side) of the unit lens 111.

As shown in FIG. 2, in the unit lens 111, the angle formed by the lens surface 112 with the surface parallel to the screen surface (dashed line (X-Y plane) in drawing) is α. The angle formed by the non-lens surface 113 with a surface parallel to the screen surface is β(β>α). The arrangement pitch of unit lenses Ill is P. In addition, the lens height of the unit lens 111 is h1. The lens height h1 is the distance until the apex t from a point v which is the most video source side of the unit lens 111. The point v indicates the position which becomes a valley bottom between unit lenses 111 from the apex t in the thickness direction of the reflective screen 10.

It should be noted that, in FIG. 2, the arrangement pitch P, angles α, β of the unit lens 111 are indicated so as to be constant in the arrangement direction of the unit lenses 111. However, in the unit lens 111, the arrangement pitch P, etc. are actually constant; however, it is configured so that the angle α becomes gradually larger as distancing from the point C (refer to FIG. 3) serving as the Fresnel center, in the arrangement direction of the unit lenses 111. In other words, the lens height h1 of the unit lens 111 becomes gradually higher as distancing from the point C serving as the Fresnel center, in the arrangement direction of the unit lenses 111.

In addition, not limiting to the above-mentioned configuration, the arrangement pitch P may be a configuration gradually varying along the arrangement direction of the unit lenses 111. In other words, the arrangement pitch P is variable as appropriate according to the size of the pixels of the video source 2 projecting the video light, the projection angle of the video source 2 (incident angle of video light on the screen surface of the reflective screen 10), screen size of the reflective screen 10, refractive index of each layer, etc.

As shown in FIG. 3, a flat part 114 at which the back surface side is a flat surface f is formed at each edge in the screen left/right direction (X direction) and screen up/down direction (Y direction) of the lens layer 11 (reflective screen 10). The flat part 114 is provided so as to surround the arranged unit lenses 111, and formed from the same material as the unit lens 111. In other words, in the reflective screen 10, the unit lens 111 and flat part 114 are integrally formed.

As shown in FIG. 2, the flat part 114 is formed so as to satisfy the relationship of h2≥h1 (lens height), in the case of defining the distance until the flat surface f from the point v which is the most video source side of the unit lens 111 in the thickness direction (Z direction) of the lens layer 11 as the flat surface height h2. Herein, the lens height h1 is desirably set to no more than 0.1 mm, for example. In addition, the width w (refer to FIG. 2) of the flat part 114 is on the order of 0.5 to 1.0%, relative to the vertical and/or horizontal dimension(s) of the screen of the reflective screen 10. It should be noted that the above-mentioned dimension and range are ultimately only examples, and are not limited to these.

Herein, as mentioned above, since the angles of the unit lenses 111 are configured so as to gradually become larger as distancing from the point C serving as the Fresnel center, the lens height h1 also gradually becomes larger accompanying this. The flat surface height h2 of the flat part 114 is formed so as to satisfy the relationship h2≥h1 relative to the maximum lens height h1max among the lens heights h1 of the respective unit lenses 111, i.e. satisfy the relationship h2≥h1max. In addition, in the present embodiment, although the flat surface height h2 of the flat part 114 is set to the same value (constant value) at the edge in each direction of the screen, the flat surface height h2 may be set to different values in each direction of the screen, as described later. In this case, at the flat surface height h2 min which is the smallest of the flat surface heights h2, it is formed so as to satisfy the relationship h2≥h1, i.e. satisfy the relationship h2 min≥h1max. The operation/function of the flat part 114 will be described later.

Figure 5:
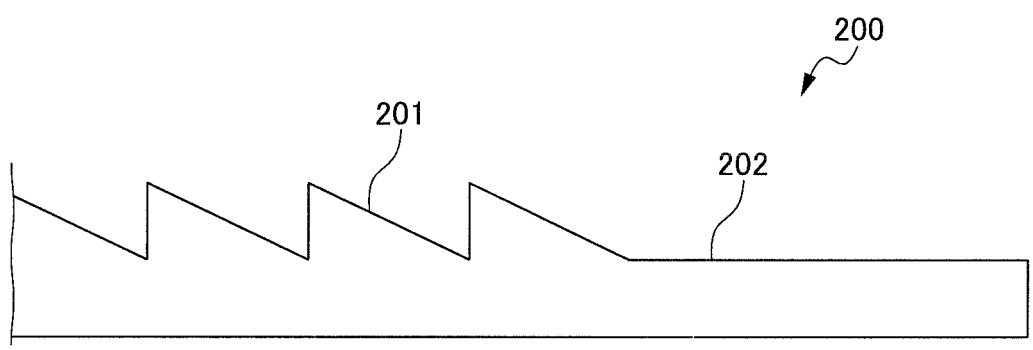
FIG. 5 is a view showing an example of a forming die 200 for forming a lens layer 11.

FIG. 5 is a view showing an example of a forming die for forming the lens layer 11. The lens layer 11, for example, is formed from a UV ray-curing resin such as a highly light transparent urethane acrylate, polyester acrylate, epoxy acrylate, polyether acrylate, polythiol, or butadiene acrylate. The lens layer 11 is prepared by a UV ray molding technique of pressing the light diffusion layer 13 (described later) to the forming die 200 forming the circular Fresnel lens shape into which the UV ray-curing resin is filled, then curing by irradiating ultraviolet rays, followed by releasing from the forming die.

The plurality of unit lenses 111 are concentrically arranged in the lens layer 11, whereby a circular Fresnel lens shape is formed in which the shape of a cross-section parallel to a direction orthogonal to the screen surface (thickness direction), which is parallel to the arrangement direction of the unit lenses 111, makes a substantially triangular shape. Herein, in the forming die 200 used in forming of the lens layer 11, an uneven shape 201 corresponding to the shape of the unit lenses 111 is formed, as shown in FIG. 5. In addition, in the forming die 200, the flat surface 202 in which an uneven shape is not formed is formed at the outer edge surrounding the uneven shape 201, i.e. at a position corresponding to each edge in the screen left/right direction and screen up/down direction of the lens layer 11, whereby it is possible to form the flat part 114 at each edge in the screen left/right direction and screen up/down direction of the lens layer 11.

It should be noted that the lens layer 11 may be formed from an ionizing radiation curing resin such as an electron beam curable resin. In addition, the lens layer 11 may be formed from a thermoplastic resin, or may be prepared from a press molding method or the like according to the Fresnel lens shape of the lens layer 11. In this case, the light diffusion layer 13, etc. may be laminated on the video source side via a junction layer (not illustrated). In addition, in the case of an extrusion molding method being possible, the lens layer 11 and light diffusion layer 13 may be formed in a state integrally laminated.

<Reflective Layer 12>

The reflective layer 12 is a layer having an operation of reflecting light. The reflective layer 12 has sufficient height in order to reflect the light, and is formed at least on the lens surface 112 of the unit lens 111. In the present embodiment, the reflective layer 12 is formed on the lens surface 112, as shown in FIG. 2, and not formed on the non-lens surface 113. It should be noted that the reflective layer 12, so long as being a thinness of an order not reflecting light, may be formed on at least part of the non-lens surface 113.

The reflective layer 12 can be formed on the lens surface 112, by vacuum depositing a metal having high light reflectivity such as aluminum, silver or nickel. In addition, the reflective layer 12, for example, can be formed by sputtering metal having high light reflectivity such as aluminum, silver or chromium, or transcribing metallic foil of these. The reflective layer 12 may establish a thickness as appropriate according to the material or the like, so long as being able to secure sufficient thickness for reflecting light.

<Light Diffusion Layer 13>

The light diffusion layer 13 is a layer with a resin having light transparency as a base material, and containing a diffusing agent which diffuses light. The light diffusion layer 13 has a function of widening the viewing angle, and improving the in-plane uniformity of brightness. As the resin serving as the base material of the light diffusion layer 13, for example, PET (polyethylene terephthalate) resin, PC (polycarbonate) resin, MS (methylmethacrylate/styrene) resin, MBS (methylmethacrylate/butadiene/styrene) resin, TAC (triacetyl cellulose) resin, PEN (polyethylene naphthalate) resin, acrylic resins, etc. can be exemplified.

As the diffusing agent contained in the light diffusion layer 13, particles made from a resin such as, for example, acrylic resin, epoxy resin or silicon-based resin, inorganic particles, etc. can be exemplified. It should be noted that the diffusing agent may be used by combining an inorganic diffusing agent and an organic diffusing agent. The diffusing agent is substantially spherically, and preferably uses an agent having an average particle size of about 1 to 50 μm. The thickness of the light diffusion layer 13 may depend on the screen size of the reflective screen 10; however, it is preferably set on the order of 100 to 2000 μm, for example. It should be noted that, although not illustrated, a colored layer, top layer, etc. may be provided to the video source side (+Z side) of the light diffusion layer 13.

<Bezel 20>

The bezel 20 is a member arranged at the video source side (+Z side) of the reflective screen unit 1. As shown in FIG. 4, the bezel 20 is configured in a frame shape, so as to cover the region corresponding to the flat part 114 (outside region of dashed line in drawing) of the reflective screen 10. The bezel 20, for example, is configured from plastic, metal, wood, etc. It should be noted that the bezel 20 may be a shape of a box frame such that covers the entire lateral surface of the reflective screen unit 1.

<Support Plate 30>

The support plate 30 is a member arranged on the back surface side (−Z side) of the reflective screen 10 in the reflective screen unit 1. The reflective screen 10 and support plate 30 are joined via the junction layer 40 (described later). So long as the support plate 30 is a member establishing sufficient rigidity to support the reflective screen 10, the material thereof is not particularly limited. As the support plate 30, for example, it is possible to use a plate member made of a metal such as aluminum, or a plate member made of resin such as acrylic resin. In addition, as the support plate 30, a plate made of metal establishing the front/back surfaces as a thin plate of aluminum or the like, and including a honeycomb structure configured from thin plates of aluminum or the like as a core (for example, honeycomb panel) may be used. The support plate 30 is preferably a member without optical transparency, from the viewpoint of suppressing a reflection of outside light, and a decline in contrast due to outside light.

<Junction Layer 40>

The junction layer 40 is a layer having a function of integrally joining the reflective screen 10 and the support plate 30. The junction layer 40 is formed by adhesive, glue or the like. As the junction layer 40, for example, it is possible to use a UV curable resin, thermoset resin, etc. The junction layer 40 is desirably black or has low optical transparency. It should be noted that, although FIG. 4 shows the junction layer 40 in sheet form, the adhesive, glue or the like serving as the junction layer 40 is coated (applied) to the back surface side (−Z side) of the reflective screen 10. For this reason, when coating the adhesive or the like serving as the junction layer 40 on the back surface side (−Z side) of the reflective screen 10, unevenness caused by the uneven shape according to the unit lenses 111 comes to be formed on the back surface side (−Z side) of the junction layer 40, as shown in FIG. 2.

In the reflective screen 10 of the present embodiment, the flat part 114 is formed at each edge of the screen left/right direction (X direction) and screen up/down direction (Y direction) on the back surface side (near side in drawing) of the lens layer 11, as shown in FIG. 3. For this reason, in the case of joining the support plate 30 to the reflective screen 10 via the junction layer 40, even if configuring the uneven shape corresponding to the unit lenses 111 of the lens layer 11 to be formed at the back surface of the junction layer 40 provided at the back surface side (−Z side) of the reflective screen 10 as shown in FIG. 2, it is possible to sufficiently adhere the reflective screen 10 and support plate 30 by the junction layer 40 at the flat part 114 formed at each edge. In this way, according to the reflective screen 10 of the present embodiment, since it is possible to improve adhesion with the support plate 30 by the flat surface f of the flat part 114, it is possible to suppress peeling apart of both after pasting.

In addition, by the flat part 114 being formed at each edge in the screen left/right direction (X direction) and screen up/down direction (Y direction) on the back surface side (near side in drawing) of the lens layer 11, it becomes possible to easily peel the formed lens layer 11 from the forming die, in the manufacturing process of the lens layer 11. Assuming a case of the unit lens 111 being formed also in the region of the flat part 114 (flat part 114 not being provided to lens layer 11), the lens layer 11 (sheet material) comes to hardly release from the forming die. In this case, if the lens layer 11 is forcibly removed for the forming die, since excessive force acts on the lens layer 11 upon releasing, there is a possibility that the lens layer 11 will whiten or cracking occurs in the unit lens 111. On the other hand, there are cases where a release agent is used in order to facilitate releasing the lens layer 11 from the forming die. However, in the case of applying a release agent to the forming die, degradation of the forming die may be advanced by the components of the release agent. In addition, in the case of adding the release agent to a resin material serving as the lens layer 11, there is a possibility of the adhesion with the junction layer 40 declining due to bleed out.

In contrast, in the reflective screen 10 of the present embodiment, since the flat part 114 (flat surface f) is formed at each edge of the lens layer 11 as described above, release from the forming die becomes easy. If release from the forming die is easy, since excessive force will not act on the lens layer 11 upon release, it is possible to suppress defects of the lens layer 11 whitening, or cracks occurring in the unit lens 111. In addition, since it is possible not to use a release agent or to drastically reduce the amount used, it is possible to suppress defects of the forming die deteriorating, or the adhesion with the junction layer 40 declining due to bleed out.

Herein, the flat part 114 (flat surface f) is desirably formed at the edge which is more to the lens surface 112 side than the non-lens surface 113 in the arrangement direction of the unit lens 111, among the edges of the lens layer 11. In other words, in the examples shown in FIG. 2 and FIG. 3, since the lens surface 112 is positioned more to the upper side (+Y side) than the non-lens surface 113 interposing the apex t in one unit lens 111 as described above, the edge which is more to the lens surface 112 side than the non-lens surface 113 in the arrangement direction of the unit lens 111 is an edge on the upper side (+Y side) in the screen up/down direction (Y direction). For this reason, the flat part 114 is desirably formed at least at this upper side (+Y side) edge. In the manufacturing process of the lens layer 11, in the case of releasing the formed lens layer 11 from the forming die, it is thereby possible to smoothly peel the lens layer 11 from the forming die more easily, by establishing the flat part 114 of this upper side (+Y side) edge as a peeling start part. Assuming a case of establishing the flat part 114 provided at an edge other than the upper side (+Y side) edge, there is a possibility of the apex t, etc. of the unit lens 111 formed in the lens layer 11 and the forming die making contact in the peeling process, and the lens layer 11 may be scratched, mold release traces may remain, or be damaged.

Although an embodiment of the present disclosure has been explained above, the present disclosure is not limited to the aforementioned embodiment, various modification and alterations are possible as in the modified embodiment described later, and these are also encompassed in the technical scope of the present disclosure. In addition, the effects described in the embodiment are merely listing the most preferred effects produced from the present disclosure, and are not limited to those described in the embodiment. It should be noted that the aforementioned embodiment and the modified embodiment described later can be used in combination as appropriate; however, a detailed explanation thereof is omitted.

Modified Embodiment

The aforementioned embodiment shows an example in which the flat parts 114 are formed at all four edges of the lens layer 11; however, it is not limited thereto. The flat part 114 of the reflective screen 10 may be formed at either edge of the screen left/right direction (X direction) or screen up/down direction (Y direction). In addition, the flat part 114 may be formed at either one (+X direction or −X direction, +Y direction or Y direction) edge in the screen left/right direction and/or screen up/down direction. Furthermore, the positions of the edges forming the flat part 114 may be the above-mentioned combination.

The flat surface heights h2 (refer to FIG. 2) of the flat parts 114 may be all identical (constant) in one reflective screen 10, or may differ according to the position of the edge. For example, the flat part 114 may slope according to a change in the lens height h1 of the unit lens 111. More specifically, in the case of the lens height h1 of the unit lens 111 gradually lowering as approaching the lower direction (−Y direction) from the upper direction (+Y direction) of the screen, it may be sloped so as to lower the flat surface height h2 of the flat part 114 formed at both ends in the screen left/right direction (X direction) approaching the lower direction from the upper direction of the screen.

In the reflective screen 10, a junction layer 40 of different forms may be joined at each of a region where the unit lens 111 is formed and a region where the flat part 114 is formed. For example, an adhesive or the like may be coated on the region where the unit lens 111 is formed to establish the junction layer 40, or double-sided tape may be pasted in a picture-frame shape to the region where the flat part 114 is formed to establish the junction layer 40. The lens layer 11 of the reflective screen 10 is not limited to a circular Fresnel lens shape, and may be a form having a linear Fresnel lens shape in which the unit lenses 111 are arranged in the screen up/down direction, etc. along the screen surface. The light diffusion layer 13 is not limited to the form containing the diffusing agent of light in the resin serving as the base material, and may be a form in which matt finishing was conducted on the surface of the video source side (+Z side) of the resin serving as the base material. In addition, it may be a form on which the matt finishing was conducted on the surface of the video source side of the lens layer 11. In this case, it is possible to omit the light diffusion layer 13 as a unit layer.

The screen (display region) of the reflective screen unit 1 may be a rectangular shape in which the long side direction is the screen up/down direction (Y direction), when viewing from the observer O1 side (refer to FIGS. 1A and 1B) of the video source side (+Z side) in the usage state. In addition, the screen of the reflective screen unit 1 may be a square shape with each side equal in the screen left/right direction and screen up/down direction, when viewing from the observer O1 side of the video source side.

EXPLANATION OF REFERENCE NUMERALS 1 reflective screen unit
2 video source
10 reflective screen
11 lens layer
12 reflective layer
13 light diffusion layer
20 bezel
30 support plate
40 junction layer
100 video display device
111 unit lens
112 lens surface
113 non-lens surface
114 flat part

The invention claimed is:

1. A reflective screen which observably displays by reflecting video light projected from a video source, the reflective screen comprising:
a lens layer of Fresnel lens shape in which a plurality of unit lenses are arranged; and
a reflective layer which is formed on the unit lens of the lens layer, and reflects light,
wherein the unit lens is convex towards a back surface side from a video source side in a thickness direction of the lens layer,
wherein a flat part at which a back surface side becomes a flat surface is formed in at least an edge of the lens layer,
wherein, in a thickness direction of the lens layer, a largest lens height h1max of a lens height h1, which is a distance from a position that is a most video source side until a position that a most back surface side of the unit lens, and a flat surface height h2 which is a distance from a position which is a most video source side of the unit lens until the flat surface of the flat part satisfy a relationship h2≥h1max, wherein the flat surface height h2 differs according to position of the flat part, and wherein a smallest flat surface height h2 min of the flat surface height h2 satisfies a relationship h2min≥h1max.

2. The reflective screen according to claim 1, wherein the lens layer is an oblong rectangular shape viewed from a video source side, and wherein the flat part is formed in at least one edge on a long side of the lens layer.

3. The reflective screen according to claim 1, wherein the lens layer is an oblong rectangular shape viewed from a video source side, and wherein the flat part is formed in at least one edge of a long side of the lens layer and at least one edge of a short side of the lens layer.

4. The reflective screen according to claim 1, wherein the unit lens includes a lens surface to which video light is incident, and a non-lens surface adjacent to the lens surface in an arrangement direction of the unit lens, and wherein the flat part is at least provided to an edge more to a side of the lens surface than the non-lens surface, in the arrangement direction of the unit lens, among edges of the lens layer.

5. A reflective screen unit comprising:

the reflective screen according to claim 1;

a bezel of window frame shape provided to a video source side of the reflective screen, and covering the flat part;

a support plate provided to a back surface side of the reflective screen, and maintaining flatness of a screen of the reflective screen; and a junction layer provided between the reflective screen and the support plate, and joining the reflective screen and the support plate.

6. A video display device comprising:

the reflective screen unit according to claim 5; and a video source which projects video light towards the reflective screen.

* * * * *

UNITED STATES PATENT AND TRADEMARK OFFICE
CERTIFICATE OF CORRECTION

| | | |
|---|---|---|
| PATENT NO. | : 12,219,288 B2 | Page 1 of 1 |
| APPLICATION NO. | : 17/906266 | |
| DATED | : February 4, 2025 | |
| INVENTOR(S) | : Yamaguchi et al. | |

It is certified that error appears in the above-identified patent and that said Letters Patent is hereby corrected as shown below:

On the Title Page

<u>Item (73), Assignee add:</u>
(73) Assignee: Dai Nippon Printing Co., Ltd., Tokyo (JP)

Signed and Sealed this
Twenty-fifth Day of November, 2025

John A. Squires
*Director of the United States Patent and Trademark Office*